Figure 1:
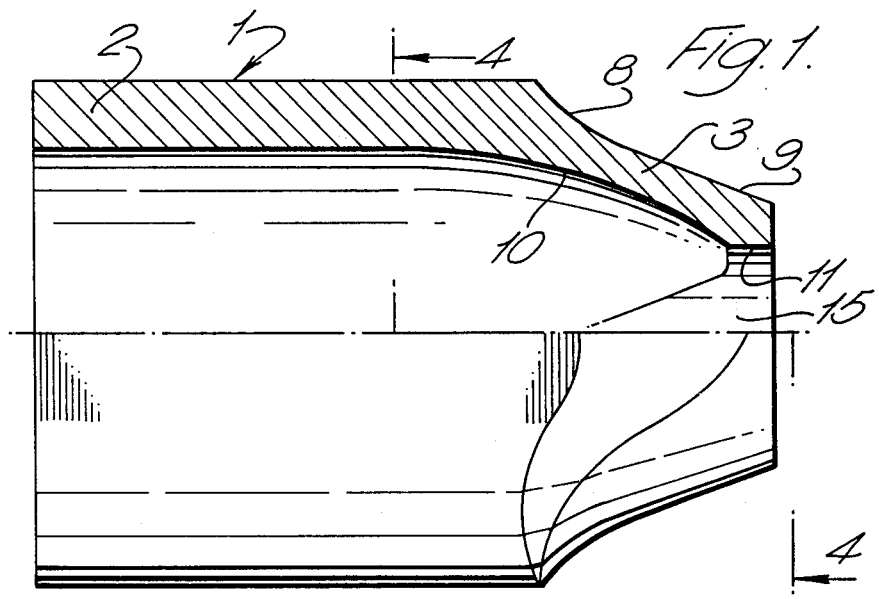

United States Patent [19]

Birks

[11] 4,068,962

[45] Jan. 17, 1978

[54] CABLE OR ROPE CLAMP

[75] Inventor: Cedric Gwilliam Birks, Leeds, England

[73] Assignee: CCL Systems Limited, Surbiton, England

[21] Appl. No.: 692,142

[22] Filed: June 2, 1976

[30] Foreign Application Priority Data

June 10, 1975 United Kingdom ............ 24807/75

[51] Int. Cl.² ............................................. F16G 11/02
[52] U.S. Cl. .................................... 403/212; 403/285; 403/14
[58] Field of Search ............ 403/212, 210, 284, 285, 403/13, 14

[56] References Cited

U.S. PATENT DOCUMENTS

| 2,895,195 | 7/1959 | Ehmann | 403/212 |
| 3,008,208 | 11/1961 | Stephan | 403/212 |
| 3,416,197 | 12/1968 | Mark | 403/212 X |
| 3,473,199 | 10/1969 | Rohland | 403/284 X |

FOREIGN PATENT DOCUMENTS

| 604,908 | 9/1960 | Canada | 403/212 |
| 1,186,584 | 4/1970 | United Kingdom | 403/212 |

Primary Examiner—Andrew V. Kundrat
Attorney, Agent, or Firm—Diller, Brown, Ramik & Wight

[57] ABSTRACT

A cable or rope clamp comprising a ferrule or sleeve having an oval body portion and a frusto-conical end portion, the wall of said end portion having an outer surface which, at the junction with said body portion, has a sharp concave part to locate said ferrule in compression dies, said wall of said end portion being generally of concavo concave shape.

5 Claims, 9 Drawing Figures

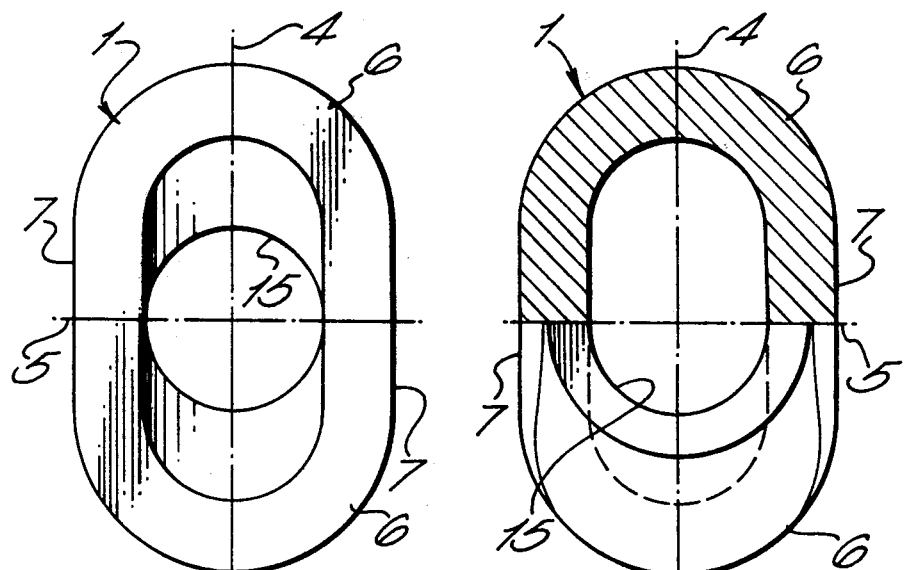
Fig. 3.  Fig. 4.
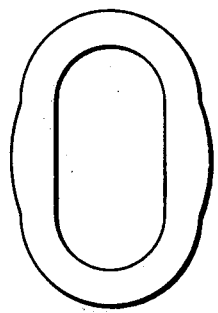   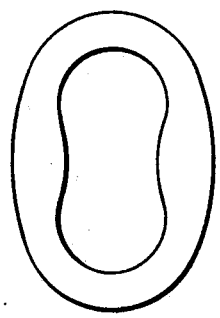   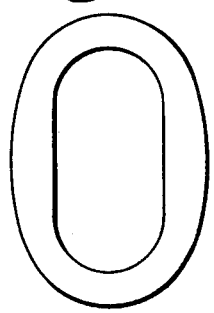
Fig. 7.  Fig. 8.  Fig. 9.

CABLE OR ROPE CLAMP

This invention relates to cable or rope clamps of the kind comprising a tubular sleeve or ferrule having a pre-shaped end or ends which is or are intended to be compressed to present a clamp having a conical end or ends.

It is the usual practice to produce the sleeves or ferrules for clamps of this kind from ductile metal, such as an aluminium, and in use to compress them using a pair of co-acting dies. Where the finished clamp is to have a conical end or ends, the dies are shaped accordingly.

Most known sleeves or ferrules have pre-shaped ends which are designed to provide the correct amount of metal in the area of the conical end or ends of the finished clamp, both for aesthetic reasons, and for the purpose of ensuring that undue pressure is not placed on the cable or rope at the point at which it emerges from the conical end. However, the pre-shaped ends of such sleeves or ferrules do not particularly take into account the problem of firmly holding the sleeve or ferrule in the dies during the operation of compressing it onto a cable or rope.

It is among the objects of the present invention to provide a sleeve or ferrule having an improved pre-shaped end or ends which is or are shaped to take into account not only the factor of providing the correct amount of metal, but also to provide better clamping thereof in the dies.

According to the present invention, there is provided a cable or rope clamp, comprising a metal sleeve or ferrule having a body portion of substantially oval cross-section and an end portion of substantially frusto-conical formation, the body portion, when viewed in cross-section, having a long axis and a short axis extending lengthwise thereof, wherein the wall of the end portion, when viewed in section on a line defined by the long axis, has an outer surface consisting of a short sharp concave part at the junction with the body portion leading to a long straight part which is inclined towards the central longitudinal axis of the ferrule.

According to a further aspect of the invention, the wall of the end portion, when viewed in section on a line defined by the long axis, has an inner surface consisting of a long concave part leading to a short straight part lying parallel with the central longitudinal axis of the ferrule, whereby the wall of the end portion, at least in area of the junction with the body portion, is of concavo concave shape.

According to the invention furthermore, the wall of the end portion, when viewed in section on a line defined by the short axis of the body portion, has an outer surface consisting of a long inclined straight, or substantially straight, part and a short straight part disposed at a different angle from that of the long part, and an inner surface which is straight and lies parallel with the longitudinal axis of the ferrule.

Figure 2:
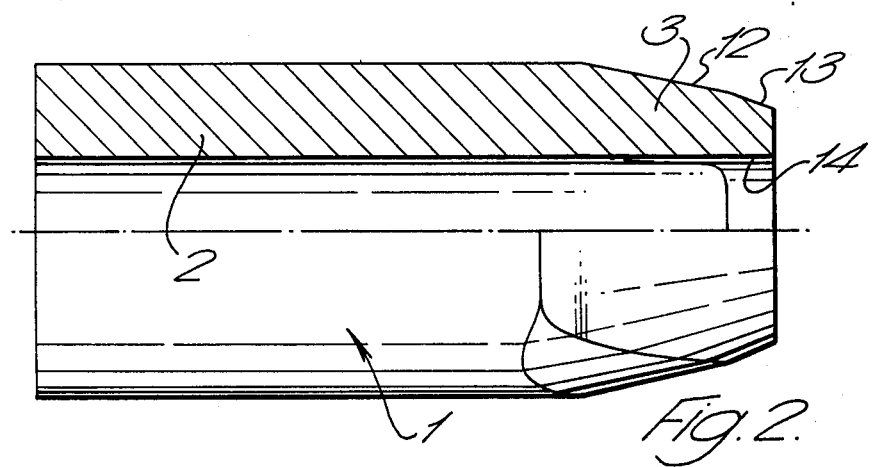

The invention is illustrated by way of example in the accompanying drawings in which, FIG. 1 is a side elevation, partly in section, of a sleeve or ferrule according to the invention, FIG. 2 is a side elevation, partly in section, taken at 90° to the view of FIG. 1, FIG. 3 is an elevation from one end, FIG. 4 is a section on the line 4—4 of FIG. 1, and FIGS. 5 to 9 are views showing alternative cross-sections for the body portion of the sleeve or ferrule.

Referring to FIGS. 1 to 4 of the drawings, a rope or cable clamp comprises a sleeve or ferrule 1 of ductile metal having a body portion 2 and a substantially frusto-conical portion 3.

As can be seen, particularly in FIGS. 3 and 4, the body portion 2 is of generally oval cross-section and has a long axis 4 and a short axis 5, the long axis passing through oppositely disposed semi-circular walls 6 and the short axis passing through straight or substantially straight parallel walls 7 interconnecting the semi-circular walls 6.

The sleeve or ferrule is initially formed as an extruded section and the substantially frusto-conical end portion 3 is preferably formed thereon by initially rough shaping the end thereof by means of a compression operation, and thereafter by being worked by means of shaving and/or other shaping operations. Alternatively, the whole operation could be carried out using a casting process.

The particular shape of the end portion 3 can clearly be seen in the drawings. Thus, the wall of the end portion, when viewed in section on a line defined by the long axis 4 as is shown in FIG. 1, has an outer surface consisting of a short sharp concave part 8 at the junction with the body portion leading to a long straight part 9, and an inner surface consisting of a long concave part 10 leading to a short straight part 11 which lies parallel with the central longitudinal axis of the ferrule. Furthermore, the wall of the end portion, when viewed in section on a line defined by the short axis 5 as is shown in FIG. 2, has an outer surface consisting of a long inclined straight part 12 leading to a short straight part 13 disposed at a different angle from that of the part 12, and an inner surface 14 which is straight and lies parallel with the longitudinal axis of the ferrule. The result of this is that the end portion 3, at least in the area of the junction with the body portion, is of concavo concave shape. Furthermore, the end portion tapers generally towards the central longitudinal axis of the sleeve or ferrule and has, at its extreme end, an internal cylindrical opening 15 which is slightly greater than the diameter of the cable or rope with which the ferrule is to be used, and which opening is co-axial with said central longitudinal axis.

In practice, the sleeve or ferrule may be used to form a loop in the end of a rope or cable. Thus, the end is first passed through the opening 15. It is then bent back on itself and the extreme end thereof is re-inserted into the sleeve or ferrule so it engages the concave part 10 which acts as a stop to accurately position the rope end. In this position, the ferrule together with the rope or cable is compressed by a pair of co-acting swaging dies having a die orifice corresponding to that of the final shape required.

The sleeve or ferrule according to the invention has the following features. The sharp change in profile provided by the concave part 8 facilitates accurate placement of the ferrule within the die orifice. In this respect, if the contour 8 is not present, it is difficult to assess by eye the correct location of the end portion in the die orifice and an inadequate swage will result. In practice, in order to save time, there is a tendency on the part of the operator to open the dies only slightly which means that he needs a simple visual guide to properly locate the end portiion in the dies. The contour 8 achieves this object. The concave part 10 prevents excessive insertion of the extreme end of the rope or cable into the ferrule, and the concavo concave shape of the wall which removes metal which would otherwise affect the quality of the swage. The central opening 15 positions the running end of the rope or cable centrally with respect to the compressed ferrule.

Figure 5:
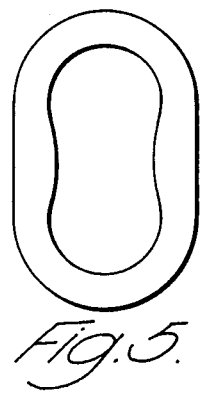
Figure 6:
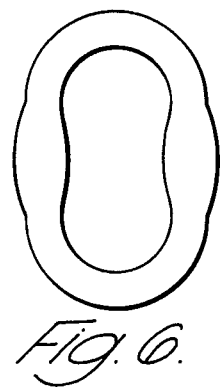

As can be seen in FIGS. 1 and 4 of the drawings, the body portion 2 has straight parallel walls 7 interconnecting semi-circular ends 6. However, it will be appreciated that the invention is not limited in this respect. Thus, the cross-sectional shape of the body portion 2 of the sleeve or ferrule may be of any well known form examples of which are shown in FIGS. 5 to 9 of the drawings. Thus, FIG. 5 shows the walls 7 as having an inwardly projecting inner surface and a straight outer surface; FIG. 6 shows the walls 7 as having an inwardly projecting inner surface and an outwardly projecting outer surface; FIG. 7 shows the walls 7 as having a straight inner surface and an outwardly projecting outer surface; FIG. 8 shows the walls 7 as having an inwardly projecting inner surface and an arcuate outer surface; and FIG. 9 shows the walls 7 as having a straight inner surface and an arcuate outer surface.

I claim:

1. A cable or rope clamp, comprising a metal sleeve or ferrule having a body portion of substantially oval cross-section and an end portion of substantially frusto-conical formation, said ferrule having a central longitudinal axis, said body portion, when viewed in transverse cross-section, having a long axis and a short axis extending lengthwise thereof, wherein the wall of said end portion, when viewed in longitudinal section along a longitudinal plane including said long axis, has an outer surface comprising a short concave part having a sharp junction with said body portion and leading directly into a long straight part inclined towards said central longitudinal axis of said ferrule.

2. A clamp as claimed in claim 1, wherein said wall of said end portion, when viewed in longitudinal section along said longitudinal plane, has an inner surface including a long concave part leading directly into a short straight part lying parallel with said central longitudinal axis of said ferrule, whereby said wall of said end portion, at least in the area of the junction with said body portion, is of concavo concave shape.

3. A clamp as claimed in claim 2, wherein said wall of said end portion, when viewed in longitudinal section along a longitudinal plane including said short axis of said body portion, has an outer surface consisting of a long inclined straight, or substantially straight, part and a short straight part disposed at a different angle from that of said long part, and an inner surface which is straight and lies parallel with said central longitudinal axis of said ferrule.

4. A clamp as claimed in claim 3, said sleeve or ferrule being in the form of an extruded section, and said end portion being formed by rough shaping in a compression operation, and subsequent working using a shaving and/or other shaping operation.

5. A clamp as claimed in claim 3, wherein said sleeve or ferrule is formed in a casting operation.

* * * * *